(12) United States Patent
Kim

(10) Patent No.: US 12,207,643 B2
(45) Date of Patent: Jan. 28, 2025

(54) SYSTEM AND METHOD FOR CONTROLLING VEHICLE

(71) Applicants: HYUNDAI MOTOR COMPANY, Seoul (KR); KIA CORPORATION, Seoul (KR)

(72) Inventor: Seong Un Kim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 205 days.

(21) Appl. No.: 17/712,641

(22) Filed: Apr. 4, 2022

(65) Prior Publication Data
US 2023/0123833 A1  Apr. 20, 2023

(30) Foreign Application Priority Data

Oct. 18, 2021 (KR) .................. 10-2021-0138722

(51) Int. Cl.
*A01M 29/10* (2011.01)
*B60Q 1/04* (2006.01)
(Continued)

(52) U.S. Cl.
CPC .............. *A01M 29/10* (2013.01); *B60Q 1/04* (2013.01); *B60Q 1/24* (2013.01); *B60Q 3/30* (2017.02); *B60Q 5/005* (2013.01); *B60R 1/1207* (2013.01); *G06F 3/165* (2013.01); *H04R 1/025* (2013.01); *H04R 3/00* (2013.01); *H05B 47/165* (2020.01); *B60Q 2300/30* (2013.01); *B60Q 2300/40* (2013.01); *H04R 2499/13* (2013.01)

(58) Field of Classification Search
CPC .. A01M 29/10; A01M 29/16; A01M 2200/01; B60Q 1/04; B60Q 1/24; B60Q 3/30; B60Q 5/005; B60Q 2300/30; B60Q 2300/40; B60Q 1/2665; B60Q 1/30; B60Q 5/00; B60R 1/1207; B60R 1/06; G06F 3/165; H04R 1/025; H04R 3/00; H04R 2499/13; H05B 47/165; H05B 47/105; H05B 47/11; G06Q 50/02
See application file for complete search history.

(56) References Cited

U.S. PATENT DOCUMENTS 11,653,642 B2 * 5/2023 Salter ................. G06V 20/56
367/139

FOREIGN PATENT DOCUMENTS

JP    2010281763 A  * 12/2010
JP    6724676 B2      7/2020

OTHER PUBLICATIONS

Machine Translation of JP2010281763A PDF File Name: "JP2010281763A_Machine_Translation.pdf".*

* cited by examiner

*Primary Examiner* — Grant Moubry
*Assistant Examiner* — Ruben Picon-Feliciano
(74) *Attorney, Agent, or Firm* — MCDONNELL BOEHNEN HULBERT & BERGHOFF LLP

(57) ABSTRACT

A system includes a server that stores pest data for each region, and a vehicle control device that receives pest data related to a current location of the vehicle from the server, and controls at least one of a sound output device or a lighting device according to driving or stopping based on the pest data received from the server. The system may actively prevent pests from approaching the vehicle according to the location and driving conditions of the vehicle to improve driver satisfaction and prevent the vehicle from being damaged.

18 Claims, 7 Drawing Sheets

(51) Int. Cl.
*B60Q 1/24* (2006.01)
*B60Q 3/30* (2017.01)
*B60Q 5/00* (2006.01)
*B60R 1/12* (2006.01)
*G06F 3/16* (2006.01)
*H04R 1/02* (2006.01)
*H04R 3/00* (2006.01)
*H05B 47/165* (2020.01)

SYSTEM AND METHOD FOR CONTROLLING VEHICLE

CROSS REFERENCE TO RELATED APPLICATIONS

This application claims the benefit of priority to Korean Patent Application No. 10-2021-0138722, filed in the Korean Intellectual Property Office on Oct. 18, 2021, the entire contents of which are incorporated herein by reference.

TECHNICAL FIELD

The present disclosure relates to a system and method for controlling a vehicle.

BACKGROUND

Recently, various kinds of pests have increased due to climate change, so that a vehicle and a driver have been directly or indirectly damaged when the vehicle travels or stops. Accordingly, although there is a method of repelling pests using products for repelling pests, in general, the products for repelling pests are limited to repellence of some pests, and thus there is a limit to repelling various kinds of pests.

Therefore, there is a need to develop a technology capable of automatically or selectively preventing pests found in various environments from approaching a vehicle according to the driving or stopping of the vehicle.

SUMMARY

The present disclosure has been made to solve the above-mentioned problems occurring in the prior art while advantages achieved by the prior art are maintained intact.

An aspect of the present disclosure provides a system and method for controlling a vehicle capable of actively preventing pests from approaching a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling a vehicle includes a server that stores pest data for each region, and a vehicle control device that receives pest data related to a current location of the vehicle from the server, and controls at least one of a sound output device or a lighting device according to driving or stopping based on the pest data received from the server.

The server may periodically update the pest data including a pest repelling frequency, a pest repelling wavelength, and a pest inducing wavelength for each pest.

The vehicle control device may control the sound output device to output the repelling frequency received from the server, and control the lighting device to output the repelling wavelength received from the server when a headlamp is turned on while the vehicle is driving.

The vehicle control device may control the sound output device to output the repelling frequency received from the server when the vehicle is driven and a headlamp is not turned on.

The vehicle control device may control the sound output device to stop outputting the pest repelling frequency received from the server or to stop outputting a human audible frequency among pest repelling frequencies when the vehicle is travelling in a downtown.

The vehicle control device may cause a user to select a pest to avoid, control the sound output device to output an repelling frequency corresponding to the selected pest, and control the lighting device to output a pest repelling wavelength or a pest inducing wavelength corresponding to the selected pest when it is determined that a camping mode is set while the vehicle is stopped.

The vehicle control device may output a pest list to allow the user to select a pest to avoid, and visually classify and output pests having an audible frequency band as the pest repelling frequency in the pest list.

The vehicle control device may control the lighting device in a trunk of the vehicle to output the pest repelling wavelength.

The vehicle control device may control a side mirror spot lighting device of the vehicle to output the pest inducing wavelength.

The vehicle control device may control the sound output device with an initial sound value and control the lighting device with an initial lighting value when it is determined that a camping mode is not set while the vehicle is stopped.

According to another aspect of the present disclosure, a method of controlling a vehicle includes receiving pest data related to a current location of the vehicle from a server, and controlling at least one of a sound output device or a lighting device according to driving or stopping based on the pest data received from the server.

The server may periodically update the pest data including a pest repelling frequency, a pest repelling wavelength, and a pest inducing wavelength for each pest.

The method may further include controlling the sound output device to output the repelling frequency received from the server, and controlling the lighting device to output the repelling wavelength received from the server when a headlamp is turned on while the vehicle is driving.

The method may further include controlling the sound output device to output the repelling frequency received from the server when a headlamp is not turned on while the vehicle is driving.

The method may further include controlling the sound output device to stop outputting the pest repelling frequency received from the server or to stop outputting a human audible frequency among pest repelling frequencies when the vehicle is travelling in a downtown.

The method may further include causing a user to select a pest to avoid, controlling the sound output device to output an repelling frequency corresponding to the selected pest, and controlling the lighting device to output a pest repelling wavelength or a pest inducing wavelength corresponding to the selected pest when it is determined that a camping mode is set while the vehicle is stopped.

The method may further include outputting a pest list to allow the user to select a pest to avoid, and visually classifying and outputting pests having an audible frequency band as the pest repelling frequency in the pest list.

The method may further include controlling the lighting device in a trunk of the vehicle to output the pest repelling wavelength.

The method may further include controlling a side mirror spot lighting device of the vehicle to output the pest inducing wavelength.

The method may further include controlling the sound output device with an initial sound value and controlling the lighting device with an initial lighting value when it is determined that a camping mode is not set while the vehicle is stopped.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
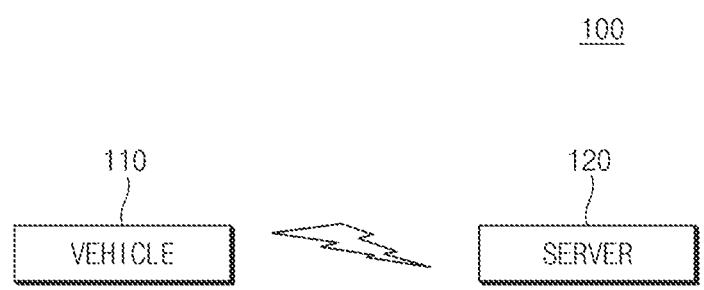
FIG. 1 is a diagram illustrating the configuration of a system for controlling a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating the configuration of a system for controlling a vehicle according to an embodiment of the present disclosure.

As illustrated in FIG. 1, a system 100 for controlling a vehicle may include a vehicle control device 110 and a server 120.

The vehicle control device 110 may receive pest data related to the current location of a vehicle from the server 120, and automatically or selectively control at least one of a sound output device or a lighting device according to the driving or stopping of the vehicle based on the pest data received from the server 120. For details, refer to the description of FIG. 2.

The server 120 may store pest data for each region of the world. In this case, the pest data may include a pest repelling frequency that is a sound frequency that pests avoid, a pest repelling wavelength that is a wavelength of light that pests avoid, and a pest inducing wavelength that is a wavelength of light that pests like. For details, refer to the description of FIG. 3.

Figure 2:
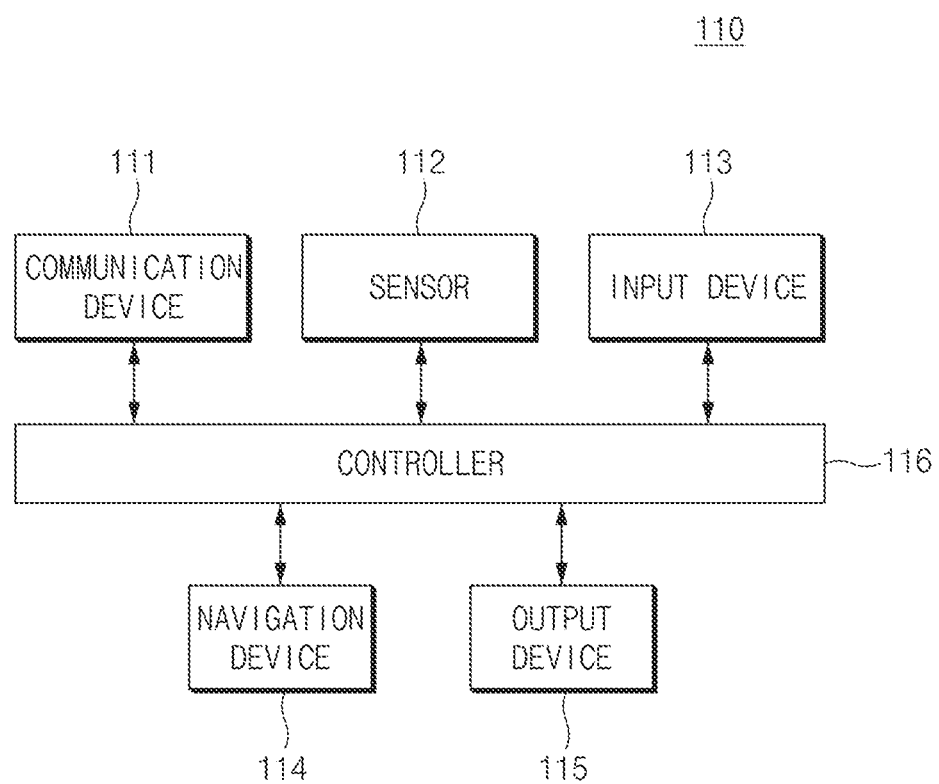
FIG. 2 is a block diagram illustrating the configuration of a vehicle control device according to an embodiment of the present disclosure.

FIG. 2 is a block diagram illustrating the configuration of a vehicle control device according to an embodiment of the present disclosure.

As shown in FIG. 2, the vehicle control device 110 may include a communication device 111, a sensor 112, an input device 113, a navigation device 114, an output device 115, and a controller 116.

For example, the communication device 111 may communication with the server 120 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The sensor 112 may detect an external illuminance of the vehicle. To this end, the sensor 112 may include a vehicle illuminance sensor. The controller 116 may control a head lamp to be turned on when the external illuminance detected by the sensor 112 is less than a preset illuminance.

The input device 113 may receive at least one input signal (a first input signal and a second input signal) corresponding to a manipulation, operation, or voice of an occupant. According to an embodiment, when the first input signal is input, the controller 116 may determine that the camping mode is set by the user, and when the second input signal is input, the controller 116 may determine that the pest the user wants to avoid is selected. According to an embodiment, the input device 113 may be implemented as a scroll wheel, a button, a knob, a touch screen, a touch pad, a lever, a track ball, or the like that can be manipulated by a user, or may be implemented as at least one of a motion sensor or a voice recognition sensor sensing a user's motion or voice, or a combination thereof.

The navigation device 114 may include a GPS receiver to receive the current location of the vehicle.

The output device 115 may include a display device, a lighting device, and a sound output device. According to an embodiment, the display device may include a display of the navigation device 114, a HUD, and a cluster. The lighting device may include a lamp provided in a trunk of a vehicle and a side mirror spot lamp of a vehicle. The sound output device may include a speaker provided inside or outside a vehicle. According to an embodiment, the sound output device may include a virtual engine sound system mounted on an eco-friendly vehicle.

The controller 116 may be implemented with various processing devices such as a microprocessor and the like in which a semiconductor chip capable of performing operations or executions of various commands is built-in, and may control operations of a vehicle control device according to an embodiment of the present disclosure.

The controller 116 may determine the state of the vehicle. According to an embodiment, the controller 116 may determine whether the vehicle is driving or is stopped.

When it is determined that the vehicle is driving, the controller 116 may determine the current location of the vehicle, and may request pest data related to the current location of the vehicle to the server 120. The controller 116 may receive pest data related to the current location from the server 120. In this case, the pest data related to the current location of the vehicle may include a list of pests inhabiting an area in which the vehicle is located, and a pest repelling frequency, a pest repelling wavelength, and a pest inducing wavelength based on characteristics of each pest.

The controller 116 may determine whether the head lamp is in a turned on state. According to an embodiment, the controller 116 may control the head lamp to be turned on when the external illuminance detected by the sensor 112 is less than a preset illuminance.

When it is determined that the head lamp is in the turned on state, the controller 116 may control the sound output device and the lighting device.

According to an embodiment, when it is determined that the head lamp is in the turned on state, the controller 116 may automatically control the sound output device to output the pest repelling frequency related to the current location received from the server 120. For example, the controller 116 may output a virtual engine sound and simultaneously maintain or sweep the pest repelling frequency. The virtual engine sound may be output in a pre-recorded form. In addition, the controller 116 may assign a weight to the pest repelling frequency or mix and output two or more pest repelling frequencies.

In addition, the controller 116 may automatically control the lighting device to output the pest repelling wavelength related to the current location received from the server 120. That is, the controller 116 may output the illumination of the pest repelling wavelength together with the illumination of the head lamp to satisfy the lighting regulations while preventing pests from gathering on the head lamp.

Meanwhile, when the controller 116 determines that the head lamp is not in the turned on state (turned off state), because it is a case where the external illuminance is greater than or equal to the preset illuminance, and the pest repelling effect is significantly reduced due to the illumination output of the pest repelling wavelength by the external illuminance, the controller 116 may control the sound output device without outputting the light having the pest repelling wavelength when the head lamp is not in the turned on state. In this case, the control operation of the sound output device may be the same as that of the sound output device when the head lamp is turned on.

When at least one of the sound output device and the light output device is controlled according to the turned on or off state of the head lamp, the controller 116 determines whether the current location of the vehicle is in a downtown. In this case, the downtown may mean an area in which the number of pedestrians around the vehicle exceeds a preset value.

When it is determined that the current location of the vehicle is in a downtown, the sound of the pest repelling frequency output from the sound output device may cause inconvenience to pedestrians, so the controller 116 may perform selective control to minimize the inconvenience of pedestrians by turning off the output of the pest repelling frequency or turning off only the output of the human audible frequency among the pest repelling frequencies, thereby blocking the inflow of sounds that may cause inconvenience to the pedestrians.

Meanwhile, when it is determined that the current location of the vehicle is not in a downtown, the controller 116 may determine that the vehicle is driving in a mountainous area, and control at least one of the sound output device or the light output device depending on whether the head lamp is turned on or off.

When it is determined that the vehicle is stopped, the controller 116 may determine the current location of the vehicle, and may request the pest data related to the current location of the vehicle from the server 120. The controller 116 may receive the pest data related to the current location of the vehicle from the server 120. In this case, the pest data related to the current location of the vehicle may include a list of pests inhabiting an area in which the vehicle is located, and a pest repelling frequency, a pest repelling wavelength, and a pest inducing wavelength based on characteristics of each pest.

The controller 116 may determine whether a camping mode is set by a user. When it is determined that the camping mode is set by the user, the controller 116 may output the pest list based on the pest data received from the server 120 such that the user can select a pest to be avoided. The controller 116 may visually classify and output pests having an audible frequency band as a pest repelling frequency in the pest list.

When it is determined that the pest to be avoided is selected by the user, the controller 116 may control the sound output device based on the pest repelling frequency corresponding to the selected pest, and may control the light output device based on the pest repelling wavelength or the pest inducing wavelength corresponding to the selected pest.

According to an embodiment, the controller 116 may control the sound output device provided inside and outside the vehicle to output the received pest repelling frequency corresponding to the selected pest. In addition, the controller 116 may assign a weight to the pest repelling frequency or mix and output two or more pest repelling frequencies.

When the pest repelling frequency is output through the sound output device provided inside and outside the vehicle, because noise may occur around the vehicle, the controller 116 may refer to the output pest list to allow the user to turn off the output of the human audible frequency among the pest repelling frequencies.

According to the embodiment, because the controller 116 outputs the pest list such that pests having an audible frequency band as a pest repelling frequency are visually classified, the controller 116 may allow the user to turn off only the output of the audible frequency and thus, may selectively control the sound output device according to the user's settings.

Therefore, the controller 116 may minimize the discomfort of the user due to noise caused by the pest repelling frequency in the interior of the vehicle or the discomfort of people around the vehicle due to the noise caused by the pest repelling frequency from the outside of the vehicle.

According to another embodiment, the controller 116 may control the lighting device in the trunk of the vehicle based on the pest repelling wavelength corresponding to the selected pest or control the side mirror spot lighting device of the vehicle based on the pest inducing wavelength corresponding to the selected pest.

According to an embodiment, the controller 116 may prevent pests from approaching the inside of the vehicle by using a variable wavelength when controlling the lighting device in the trunk (or tailgate) of the vehicle, and may induce pests to the outside of the vehicle by using the variable wavelength when controlling the side mirror spot lighting device of the vehicle.

Meanwhile, when it is determined that the camping mode is not set by the user, the controller 116 may control the sound output device with an initial sound value and control the light output device with an initial lighting value. In this case, the sound initial value may mean an output value to which the pest repelling frequency is not applied, and the initial lighting value may mean an output value to which the pest repelling wavelength or the pest inducing wavelength is not applied.

Figure 3:
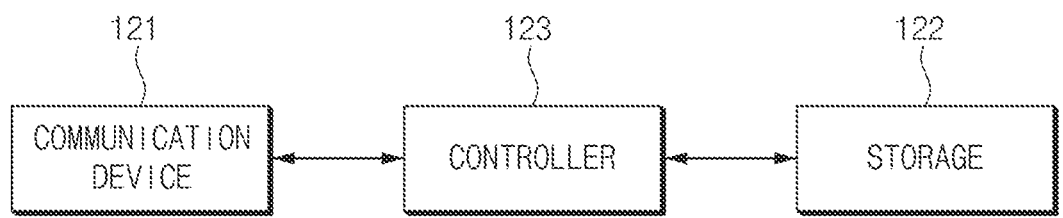
FIG. 3 is a block diagram illustrating the configuration of a server according to an embodiment of the present disclosure.

FIG. 3 is a block diagram illustrating the configuration of a server according to an embodiment of the present disclosure.

As shown in FIG. 3, the server 120 may include a communication device 121, storage 122, and a controller 123.

For example, the communication device 121 may communication with the vehicle control device 110 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like.

The storage 122 may store at least one algorithm for performing operations or executions of various commands for the operation of the server according to an embodiment of the present disclosure. The storage 122 may store pest data for each region, and when the pest data is periodically updated, the updated pest data may be stored. The storage 122 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, or an optical disk.

The controller 123 may be implemented with various processing devices such as a microprocessor and the like in which a semiconductor chip capable of performing operations or executions of various commands is built-in, and may control operations of a server according to an embodiment of the present disclosure.

In detail, when the controller 123 receives a request for pest data related to the current location of the vehicle from the vehicle control device 110, the controller 123 may transmit the requested pest data among the pest data stored in the storage 122 to the vehicle control device 110. In addition, the controller 123 may continuously update the pest data for each region. In this case, the pest data may include a kind of pest inhabiting in each region, a pest repelling frequency that the pest avoids, a pest repelling wavelength that the pest avoids, and a pest inducing wavelength that the pest likes. More details of the pest repelling wavelength and the pest inducing wavelength will be referred to FIG. 4.

Figure 4:
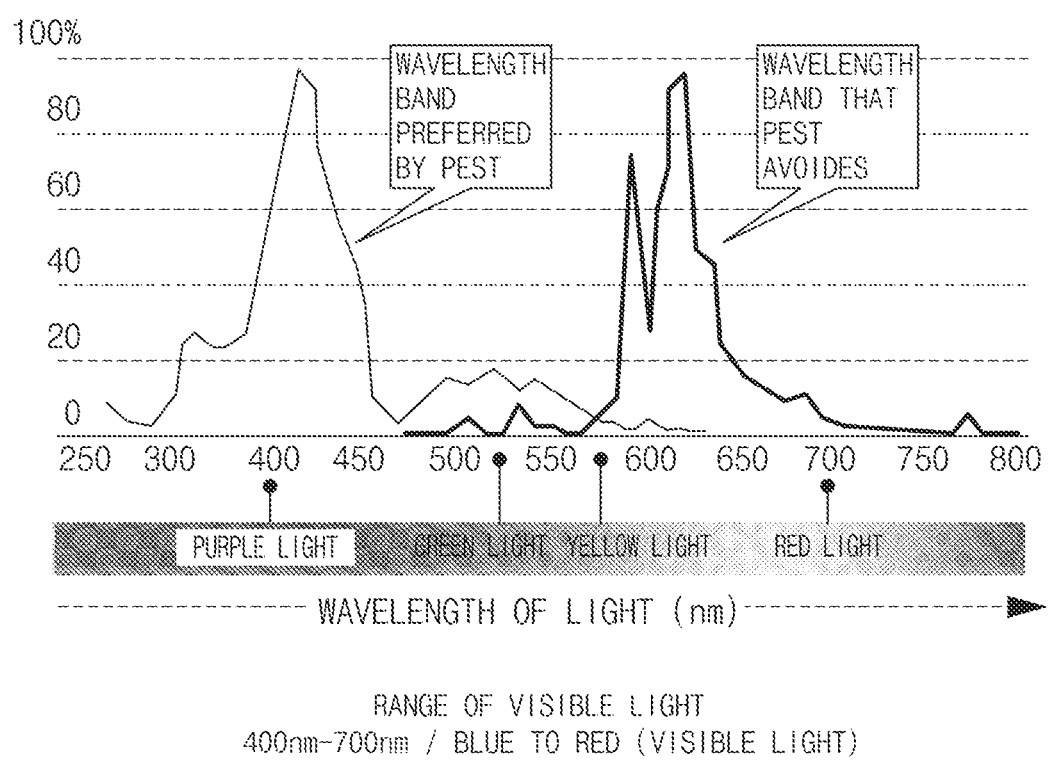
FIG. 4 is a graph illustrating the relationship between pests and wavelengths of light.

FIG. 4 is a graph illustrating the relationship between pests and wavelengths of light.

As illustrated in FIG. 4, because the wavelength band that pests avoid is a yellow series of 600 nm to 650 nm, it is possible to prevent legal problems by outputting the pest repelling wavelength together when the head lamp of the vehicle is turned on, and it is possible to prevent pests from gathering on the head lamp. In addition, because the wavelength band preferred by pests is a purple series of 400 nm to 450 nm, it is possible to control the side mirror spot lamp of the vehicle to be turned on as a purple lamp to induce the pests to the outside of the vehicle.

Figure 5:
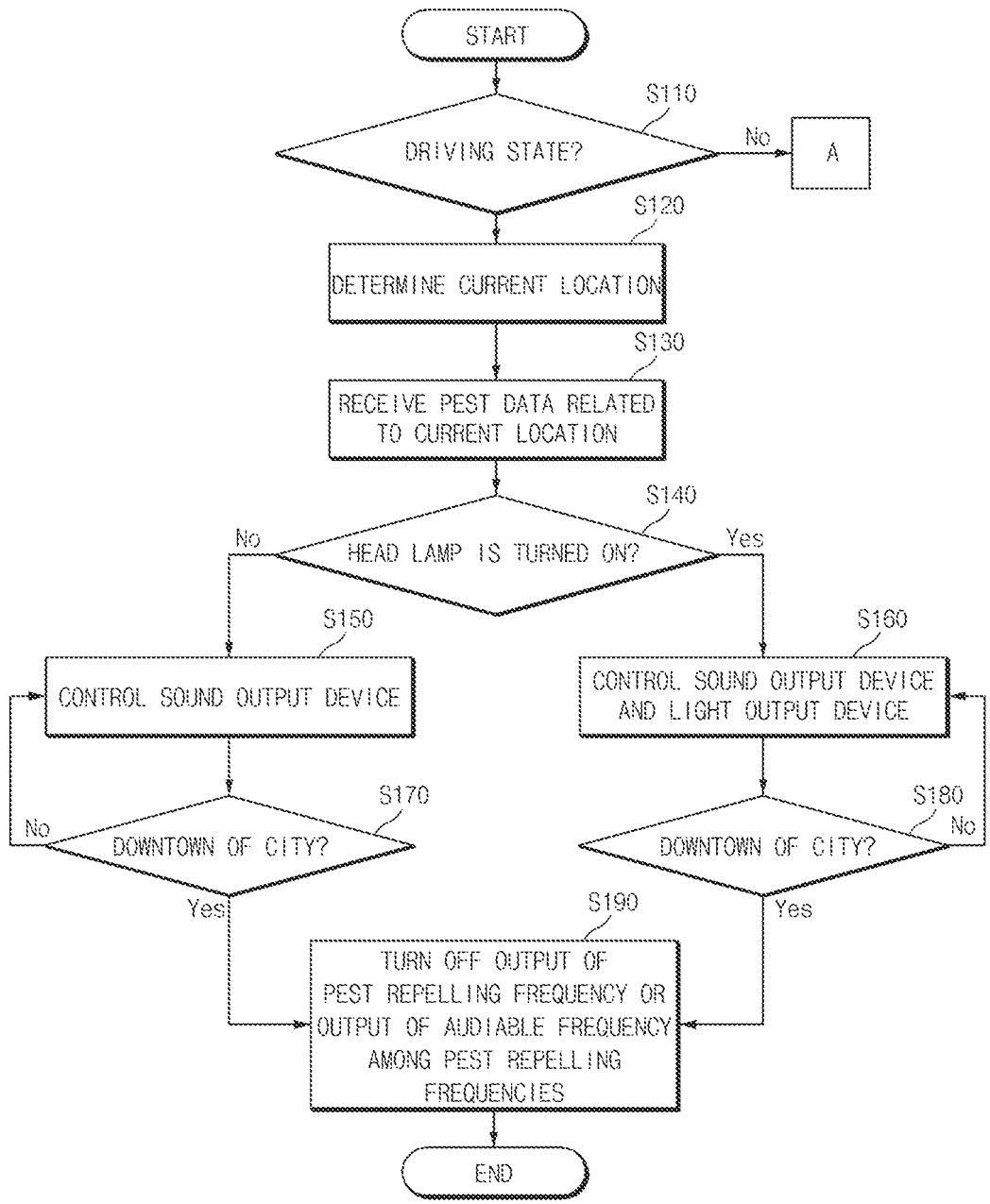
FIG. 5 is a flowchart illustrating a method of controlling a vehicle according to an embodiment of the present disclosure.

FIG. 5 is a flowchart illustrating a method of controlling a vehicle according to an embodiment of the present disclosure.

As illustrated in FIG. 5, the controller 116 may determine whether the vehicle is driving at S110.

When it is determined at S110 that the vehicle is driving (Y), the controller 116 may determine the current location of the vehicle at S120. In addition, at S120, the controller 116 may request pest data related to the current location of the vehicle from the server 120. The controller 116 may receive pest data related to the current location from the server 120 at S130. In this case, the pest data related to the current location of the vehicle may include a list of pests inhabiting an area in which the vehicle is located, and a pest repelling frequency, a pest repelling wavelength, and a pest inducing wavelength based on characteristics of each pest. Meanwhile, when it is determined in S110 that the vehicle is not driving, the controller 116 may determine that the vehicle is in a stopped state and may perform 'A'. For the detailed description of 'A', refer to FIG. 6.

When receiving the pest data related to the current location of the vehicle from the server 120, the controller 116 may determine whether the headlamp is in a turned on state at S140. According to an embodiment, the controller 116 may control the head lamp to be turned on when the external illuminance detected by the sensor 112 is less than a preset illuminance.

Accordingly, when it is determined at S140 that the head lamp is in the turned on state (Y), the controller 116 may determine that the external illuminance is less than the preset illuminance and may control the sound output device and the lighting device at S160.

According to the embodiment, at S160, the controller 116 may control the sound output device to output the pest repelling frequency associated with the current location received from the server 120. For example, the controller 116 may output a virtual engine sound and simultaneously maintain or sweep the pest repelling frequency. The virtual engine sound may be output in a pre-recorded form. In addition, the controller 116 may assign a weight to the pest repelling frequency or mix and output two or more pest repelling frequencies.

In addition, at S160, the controller 116 may control the lighting device to output the pest repelling wavelength related to the current location received from the server 120. That is, the controller 116 may output the illumination of the pest repelling wavelength together with the illumination of the head lamp to satisfy the lighting regulations while preventing pests from gathering on the head lamp.

Meanwhile, when it is determined at S140 that the head lamp is not in the turned on state (turned off state) (N), the controller 116 may determine that the external illuminance is equal to or greater than the preset illuminance. In this case, because the pest repelling effect is significantly reduced by the illumination output of the pest repelling wavelength due to the external illuminance, at S150, the controller 116 may control the sound output device without outputting the light having the pest repelling wavelength when the head lamp is not in the turned on state. The control operation of the sound output device at S150 may be the same as that of the sound output device at S160.

When at least one of the sound output device or the light output device is controlled according to the turned on or off state of the head lamp as at S150 or S160, the controller 116 determines whether the current location of the vehicle is in a downtown at S170 and S180. In this case, the downtown may mean an area in which the number of pedestrians around the vehicle exceeds a preset value.

When it is determined at S170 and S180 that the current location of the vehicle is in a downtown (Y), at S190, the controller 116 may selectively control to minimize the inconvenience of pedestrians by turning off the output of the pest repelling frequency or turning off only the output of the human audible frequency among the pest repelling frequencies. Accordingly, the controller 116 may block the inflow of sounds that may cause inconvenience to pedestrians.

Meanwhile, when it is determined at S170 that the current location of the vehicle is not in a downtown, the controller 116 may perform S150. When it is determined at S180 that the current location of the vehicle is not in a downtown, the controller 116 may determine that the vehicle is driving in a mountainous area and may perform S160.

Figure 6:
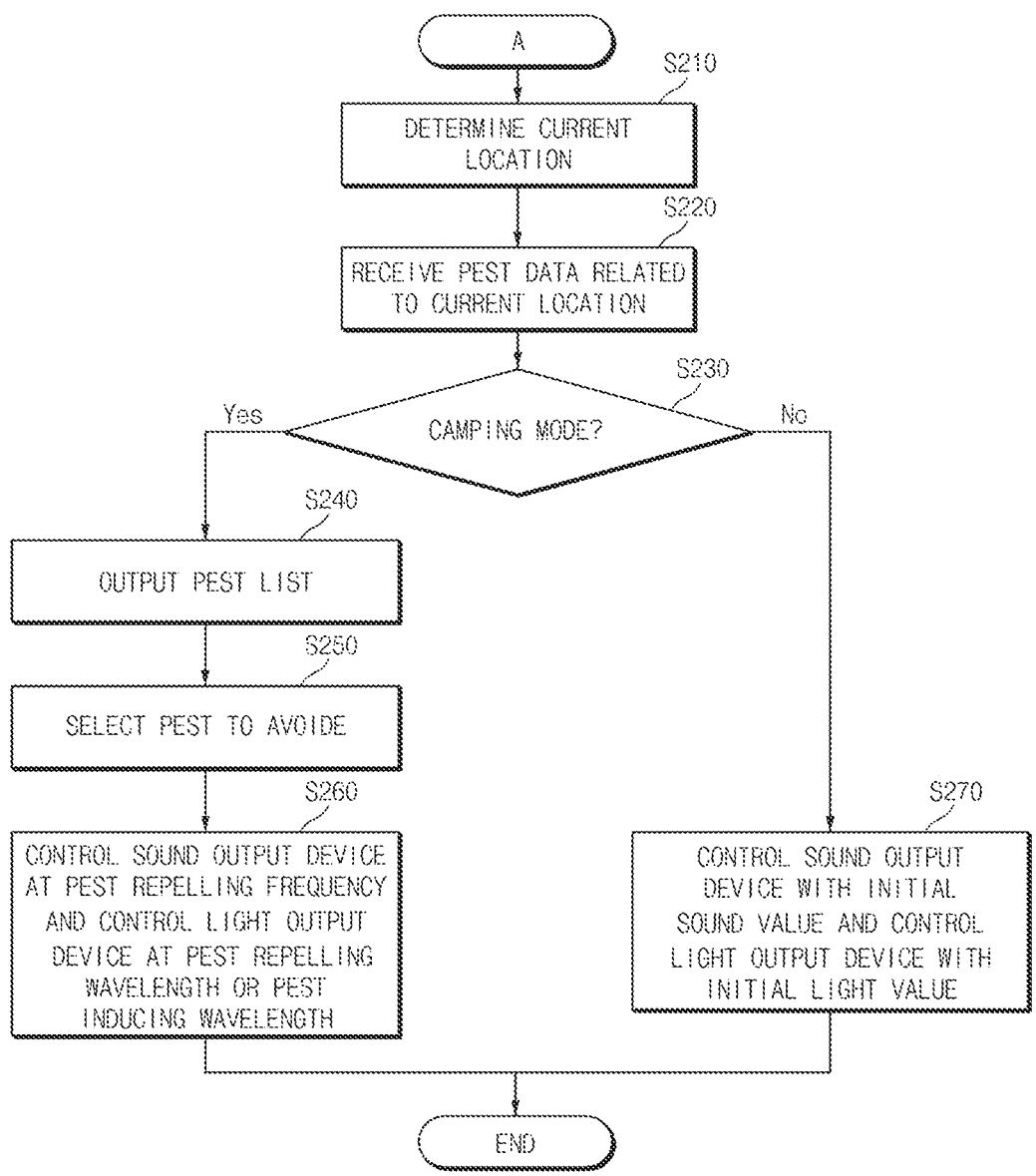
FIG. 6 is a flowchart illustrating a method of controlling a vehicle according to another embodiment of the present disclosure.

FIG. 6 is a flowchart illustrating a method of controlling a vehicle according to another embodiment of the present disclosure.

As illustrated in FIG. 6, when it is determined that the vehicle is stopped, at S210, the controller 116 may determine the current location of the vehicle. At S210, the controller 116 may request the pest data related to the current location of the vehicle from the server 120.

The controller 116 may receive the pest data related to the current location of the vehicle from the server 120 at S220. In this case, the pest data related to the current location of the vehicle may include a list of pests inhabiting an area in which the vehicle is located, and a pest repelling frequency, a pest repelling wavelength, and a pest inducing wavelength based on characteristics of each pest.

At S230, the controller 116 may determine whether the camping mode is set by the user. When it is determined at S230 that the camping mode is set by the user (Y), at S240, the controller 116 may output the pest list based on the pest data received from the server 120 such that the user can select a pest to be avoided. At S240, the controller 116 may visually classify and output pests having an audible frequency band as a pest repelling frequency in the pest list.

When it is determined at S250 that the pest to be avoided is selected by the user, at S260, the controller 116 may control the sound output device based on the pest repelling frequency corresponding to the selected pest, and may control the light output device based on the pest repelling wavelength corresponding to the selected pest.

According to an embodiment, at S260, the controller 116 may control the sound output device provided inside and outside the vehicle to output the received pest repelling frequency corresponding to the selected pest. In addition, the controller 116 may assign a weight to the pest repelling frequency or mix and output two or more pest repelling frequencies.

When the pest repelling frequency is output through the sound output device provided inside and outside the vehicle, because noise may occur around the vehicle, at S240, the controller 116 may refer to the output pest list to allow the user to turn off the output of the human audible frequency among the pest repelling frequencies.

According to the embodiment, because the controller 116 outputs the pest list such that pests having an audible frequency band as a pest repelling frequency are visually classified, at S260, the controller 116 may allow the user to turn off only the output of the audible frequency and thus, may selectively control the sound output device according to the user's settings.

Therefore, the controller 116 may minimize the discomfort of the user due to noise caused by the pest repelling frequency in the interior of the vehicle or the discomfort of people around the vehicle due to the noise caused by the pest repelling frequency from the outside of the vehicle.

According to another embodiment, at S260, the controller 116 may control the lighting device in the trunk of the vehicle based on the pest repelling wavelength corresponding to the selected pest or control the side mirror spot lighting device of the vehicle based on the pest inducing wavelength corresponding to the selected pest.

For example, the controller 116 may prevent pests from approaching the inside of the vehicle by using a variable wavelength when controlling the lighting device in the trunk (or tailgate) of the vehicle, and may induce pests to the outside of the vehicle by using the variable wavelength when controlling the side mirror spot lighting device of the vehicle.

Meanwhile, when it is determined at S230 that the camping mode is not set by the user, at S270, the controller 116 may control the sound output device with an initial sound value and control the light output device with an initial lighting value. In this case, the sound initial value may mean an output value to which the pest repelling frequency is not applied, and the initial lighting value may mean an output value to which the pest repelling wavelength or the pest inducing wavelength is not applied.

Figure 7:
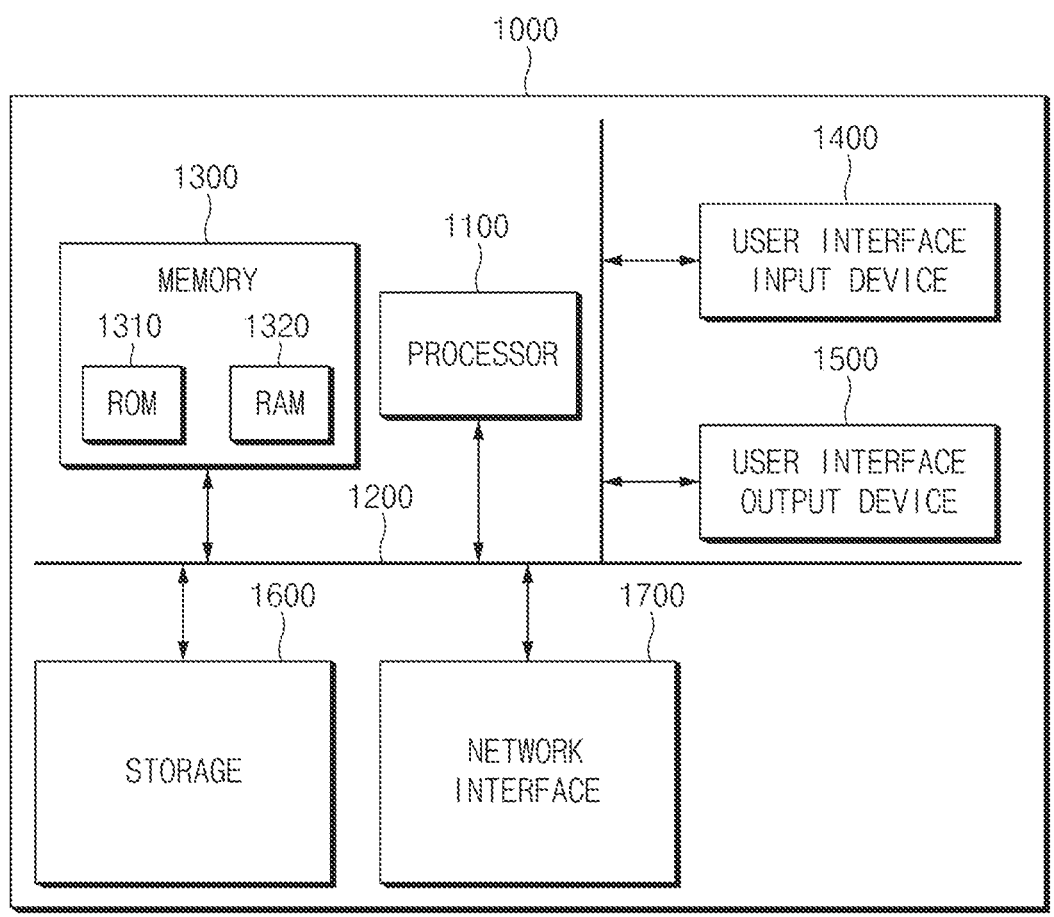
FIG. 7 is a block diagram illustrating a computing system for executing a method according to an embodiment of the present disclosure.

FIG. 7 is a block diagram illustrating a computing system for executing a method according to an embodiment of the present disclosure.

Referring to FIG. 7, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The system and method for controlling a vehicle according to an embodiment of the present disclosure may actively prevent pests from approaching the vehicle according to the location and driving conditions of the vehicle, so that it is possible to improve driver satisfaction and prevent the vehicle from being damaged.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

The invention claimed is:

1. A system for controlling a vehicle, the system comprising:
a server configured to store pest data for each region; and
a vehicle control device configured to receive pest data related to a current location of the vehicle from the server, and control at least one of a sound output device or a lighting device according to driving or stopping based on the pest data received from the server;
wherein the pest data related to a current location of the vehicle includes a list of pests inhabiting an area in which the vehicle is located;
wherein the vehicle control device is configured to control the sound output device to stop outputting a pest repelling frequency received from the server or to stop outputting a human audible frequency among pest repelling frequencies when the vehicle is travelling in a downtown; and
wherein the downtown includes an area in which a number of pedestrians around the vehicle exceeds a preset value.

2. The system of claim 1, wherein the server is configured to periodically update the pest data including the pest repelling frequency, a pest repelling wavelength, and a pest inducing wavelength for each pest.

3. The system of claim 2, wherein the vehicle control device is configured to control the sound output device to output the pest repelling frequency received from the server, and control the lighting device to output the pest repelling wavelength received from the server when a headlamp is turned on while the vehicle is driving.

4. The system of claim 2, wherein the vehicle control device is configured to control the sound output device to output the pest repelling frequency received from the server when the vehicle is driven and a headlamp is not turned on.

5. The system of claim 2, wherein the vehicle control device is configured to cause a user to select a pest to avoid, control the sound output device to output a repelling frequency corresponding to the selected pest, and control the lighting device to output a pest repelling wavelength or a pest inducing wavelength corresponding to the selected pest when it is determined that a camping mode is set while the vehicle is stopped.

6. The system of claim 5, wherein the vehicle control device is configured to output a pest list to allow the user to select a pest to avoid, and to visually classify and output pests having an audible frequency band as the pest repelling frequency in the pest list.

7. The system of claim 5, wherein the vehicle control device is configured to control the lighting device in a trunk of the vehicle to output the pest repelling wavelength.

8. The system of claim 5, wherein the vehicle control device is configured to control a side mirror spot lighting device of the vehicle to output the pest inducing wavelength.

9. The system of claim 1, wherein the vehicle control device is configured to control the sound output device with an initial sound value, and to control the lighting device with an initial lighting value when it is determined that a camping mode is not set while the vehicle is stopped.

10. A method of controlling a vehicle, the method comprising:
receiving, by a control device, pest data related to a current location of the vehicle from a server; and
controlling at least one of a sound output device or a lighting device according to driving or stopping based on the pest data received from the server;
wherein the pest data related to a current location of the vehicle includes a list of pests inhabiting an area in which the vehicle is located;
wherein the method further comprises:
controlling the sound output device to stop outputting a pest repelling frequency received from the server, or to stop outputting a human audible frequency among pest repelling frequencies when the vehicle is travelling in a downtown; and
wherein the downtown includes an area in which a number of pedestrians around the vehicle exceeds a preset value.

11. The method of claim 10, wherein the server is configured to periodically update the pest data including the pest repelling frequency, a pest repelling wavelength, and a pest inducing wavelength for each pest.

12. The method of claim 11, further comprising:
controlling the sound output device to output the pest repelling frequency received from the server, and controlling the lighting device to output the pest repelling wavelength received from the server when a headlamp is turned on while the vehicle is driving.

13. The method of claim 11, further comprising:
controlling the sound output device to output the pest repelling frequency received from the server when a headlamp is not turned on while the vehicle is driving.

14. The method of claim 11, further comprising:
causing a user to select a pest to avoid, controlling the sound output device to output a repelling frequency corresponding to the selected pest, and controlling the lighting device to output a pest repelling wavelength or a pest inducing wavelength corresponding to the selected pest when it is determined that a camping mode is set while the vehicle is stopped.

15. The method of claim 14, further comprising:
outputting a pest list to allow the user to select a pest to avoid, and visually classifying and outputting pests having an audible frequency band as the pest repelling frequency in the pest list.

16. The method of claim 14, further comprising:
controlling the lighting device in a trunk of the vehicle to output the pest repelling wavelength.

17. The method of claim 14, further comprising:
controlling a side mirror spot lighting device of the vehicle to output the pest inducing wavelength.

18. The method of claim 10, further comprising:
controlling the sound output device with an initial sound value and controlling the lighting device with an initial lighting value when it is determined that a camping mode is not set while the vehicle is stopped.

* * * * *